US006272674B1

(12) United States Patent
Holiday, Jr.

(10) Patent No.: US 6,272,674 B1
(45) Date of Patent: Aug. 7, 2001

(54) METHOD AND APPARATUS FOR LOADING A JAVA APPLICATION PROGRAM

(75) Inventor: Matthew R. Holiday, Jr., Allen, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/211,209

(22) Filed: Dec. 14, 1998

(51) Int. Cl.$^7$ ........................................................ G06F 9/45
(52) U.S. Cl. ........................................................................ 717/1
(58) Field of Search ............................................... 717/1, 8

(56) References Cited

U.S. PATENT DOCUMENTS

| | | | |
|---|---|---|---|
| 5,136,705 | * 8/1992 | Stubbs et al. | 714/27 |
| 5,442,790 | * 8/1995 | Nosenchuck | 717/9 |
| 5,758,160 | * 5/1998 | McInerney et al. | 717/1 |
| 5,956,506 | * 9/1999 | Cobb et al. | 709/101 |
| 5,987,245 | * 11/1999 | Gish | 709/312 |
| 6,139,199 | * 10/2000 | Rodriguez | 717/9 |

OTHER PUBLICATIONS

Devanbu et al., Techniques for Trusted Software Engineering, IEEE, p. 126–135, 1998.*
Brashear, Object–Oriented Programming in Ada, IEEE, p. 543–549, 1992.*
Roger Riggs, Java™ Product Versioning Specification, Nov. 30, 1998, pp. 1–16, published in Mountain View, California.

* cited by examiner

Primary Examiner—Mark Powell
Assistant Examiner—John Q. Chavis
(74) Attorney, Agent, or Firm—Carr & Storm, L.L.P.

(57) ABSTRACT

An apparatus and method for loading software into a Java virtual machine ("JVM") in a manner suited for real-time server applications. The software to be loaded is organized by Java package and class so that an application may be loaded in units of packages. Each package, and each class within a package, is loaded into the JVM in an order such that no package or class is loaded before the packages or classes upon which it depends. All software for an application is loaded into the JVM, and any compilation, optimization, or initialization takes place, prior to execution of the application program, so that no delays are incurred during such execution. Software loaded into the JVM, as well as attributes of that software, are identified. Versions of packages are compared when loading the packages to ensure compatibility. An "image" of loaded software is created, which image may be reused by the JVM in order to restart an application rapidly following a failure. A loader environment within the JVM contains information about all loaded applications, packages, and classes, their attributes, and their interrelationships.

27 Claims, 4 Drawing Sheets

METHOD AND APPARATUS FOR LOADING A JAVA APPLICATION PROGRAM

TECHNICAL FIELD

The invention relates generally to Java application programs and, more particularly, to a method and apparatus for loading a Java application program to a Java virtual machine.

BACKGROUND OF THE INVENTION

Large-scale, complex computer systems are brought into use through integration of software programs with a hardware platform. In many cases these large-scale systems require multiple configurations of software depending on the particular installation. Additionally, many of these systems are real-time in nature, where the speed and, more importantly, the predictability of the system's performance is key. Lastly, many systems are "servers" which means that they are expected to run continuously for long periods of time without interruption.

A telecommunication network is an example of such a complex system. Telecommunication networks facilitate communications between a large number of public and private communications systems by providing numerous functions such as switching, accounting, and time management. A telecommunications network provides these functions through network switches, or nodes, interconnected by links, or channels, of transmission media such as wire, fiber-optic cable, or radio waves. Some of the nodes are connected to one or more users.

Modern telecommunication networks require complex, automated switching and, to that end, software programs are written to provide dependable performance and efficient use of resources, along with implementing service features and functions, such as Call Waiting, Caller ID, and the like. In such systems there may be different configurations depending on what types of transmission media are used, what types of users are served, and what mix of features are purchased. In order to perform dependably, all software required for operation must be loaded into the system and initialized before the system begins its normal processing; otherwise, unpredictable variations in performance, and even unacceptable delays, might be experienced as needed software is identified, loaded, and initialized before processing can continue.

A computer language for implementing software for such systems is "Java." Java was introduced by Sun Microsystems, Inc., of Palo Alto, Calif., and has been described as an object-oriented, distributed, interpreted, robust, secure, architecture-neutral, portable, high-performance, multithreaded, and dynamic computer language. A key feature of Java with respect to this invention is its ability to load software dynamically. In many programming systems today, entire software applications are constructed (i.e., software modules are linked together) as a unit. Java, however, allows software modules to be loaded and linked into a running program environment, known as a Java virtual machine (JVM). Thus, changing one module need not involve re-linking the entire application. Furthermore, applications may be extended by adding modules to the application without interrupting execution of the application. This capability makes Java very useful in the construction of server software applications.

In the Java programming language, individual source files describing classes are compiled to produce class files, which are the most basic unit of software introduced into a system. As used herein, the term "class" refers to a generalized category that describes a group of more specific methods that can exist within it, and are comparable in concept to the types of "pigeonholes" used to organize information. The term "method" as used herein denotes a procedure or a function. Data and methods, taken together, generally serve to define the contents and capabilities of an object.

Classes may be grouped into "packages," but packages are not presently a unit by which software code is loaded into a system. In a standard Java virtual machine (JVM), classes are typically loaded one at a time from class files, or perhaps from a compressed archive containing a number of class files within it, possibly from unrelated packages. In accordance with a method of loading often referred to as "lazy loading," a class is not loaded until that class is needed by the JVM. Any necessary initialization for that class is similarly deferred for as long as possible. These techniques are suitable for software systems, such as "applets" in web browsers, that are primarily user-interactive. If all software that might possibly be needed were to be loaded and initialized before the applet could interact with the user, the user would experience an unacceptable delay.

While lazy loading is appropriate for non-real time systems, such as that described above, lazy loading of software applications into the JVM is usually not appropriate for real-time server applications. The unpredictable performance and unexpected latency associated with lazy loading is often intensified because Java classes are commonly dependent on other classes. In many cases, in order to load one class, if other classes upon which the one class depends have not yet been loaded, the JVM will stop loading the one class while it attempts to load the other classes.

In accordance with conventional JVM technology, application software is executed by first loading a "key" class and then executing a particular method of that class. In a stand-alone application, the key class is a class with a "main" method which provides a starting point for the program. In an applet in a browser window, the key class is derived from the base applet class and is loaded, and a "start" method is called. In either the stand-alone application or the applet, once the key class is loaded, the remaining classes are identified and loaded as required. In some cases, security controls are used to constrain class loading. For example, an applet can only load classes from the same server from which the applet itself was initially loaded. The JVM does keep track of classes loaded, but does not keep track of packages loaded, nor does it keep track of certain attributes of classes and packages that might be of interest.

For reasons of manageability, in a large-scale system having at least a single JVM, entire applications may be loaded more efficiently as collections of packages, each of which packages encapsulates a collection of classes. This reduces, by an order of magnitude, the number of software objects that must be managed. Furthermore, if more than one application is loaded into a single JVM of the system, some packages may be shared between the applications and so need only be loaded once, reducing load times and saving memory space. In such a case, the package becomes the unit of software loaded into the system, rather than the individual class file. It thus becomes more important to ensure that the package, as a concrete unit of software, can be immediately loaded from a package load file that contains all classes belonging to the package.

Another feature of large-scale systems is that some software objects that make up the configuration of a running system may not have been developed, tested, and packaged at the same time. Instead, the objects may be of different vintages, and include some components that have remained unchanged for a long time, and some other components that continually change as the software is further developed and improved. As a result, it is often important to know what software objects are loaded into such a system, and to be able to ensure that only objects of compatible vintages are combined together.

Accordingly, a continuing search has been directed to the development of methods for loading classes without incurring unpredictable performance and unexpected latency associated with lazy loading, for loading packages only as needed to avoid increased load times and depleting memory unnecessarily, and for ensuring that software objects loaded in a system are of compatible vintages.

SUMMARY OF THE INVENTION

According to the present invention, Java software applications are loaded into a Java virtual machine (JVM) in a manner suited for real-time server applications. The software to be loaded is organized by Java package and class so that an application may be loaded in units of packages. Each package, and each class within a package, is loaded into the JVM in an order such that no package or class is loaded before the packages or classes upon which it depends. All software for an application is loaded into the JVM, and any compilation, optimization, or initialization takes place, prior to execution of the application program, so that no delays are incurred during such execution. Software loaded into the JVM, as well as attributes of that software, are identified. Versions of packages are compared when loading the packages to ensure compatibility. An "image" of loaded software is created, which image may be reused by the JVM in order to restart an application rapidly following a failure. A loader environment within the JVM contains information about all loaded applications, packages, and classes, their attributes, and their interrelationships.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
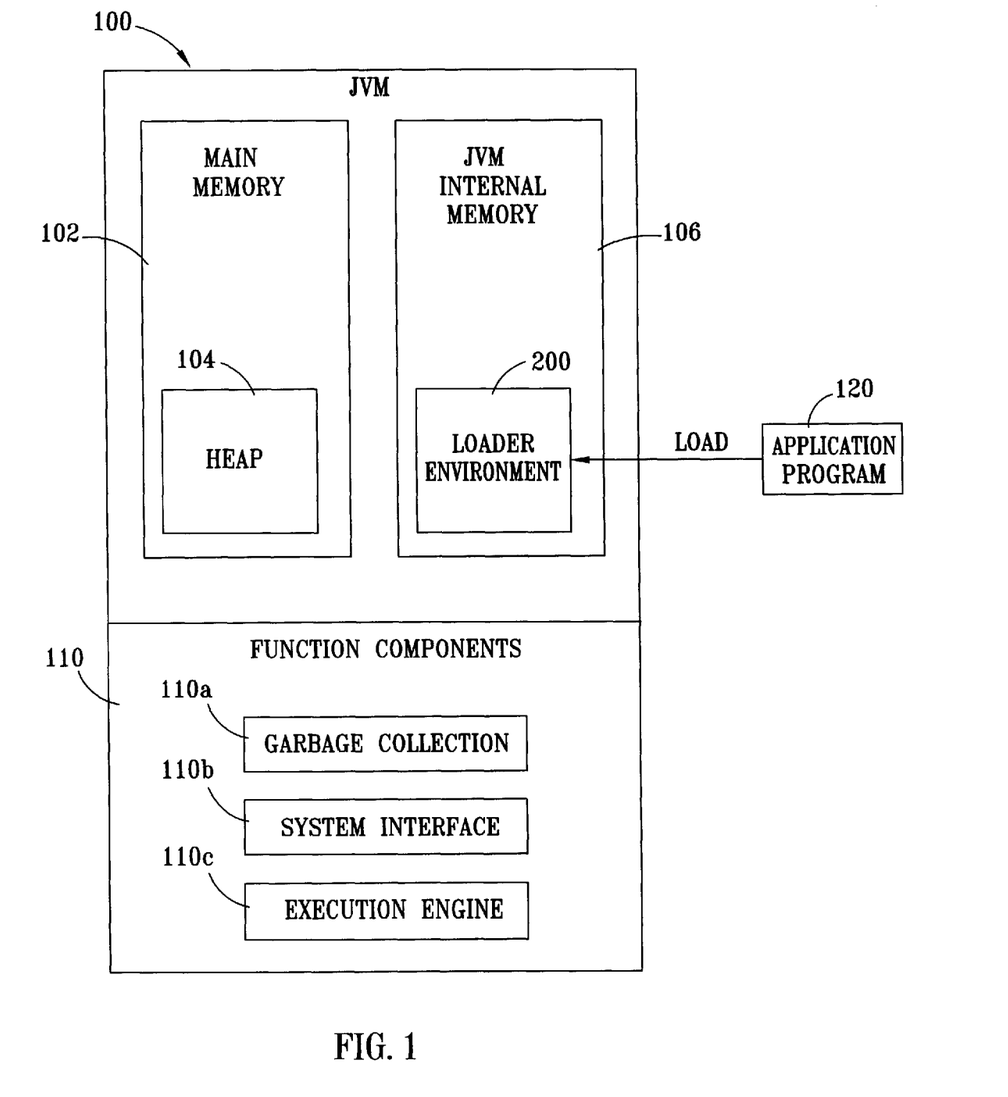
FIG. 1 is a block diagram illustrating a Java Virtual Machine ("JVM")

Referring to FIG. 1 of the drawings, the reference numeral 100 generally designates a Java Virtual Machine ("JVM") embodying features of the present invention. The JVM 100 may be implemented on any of a number of different computer platforms (not shown), such as a personal computer ("PC"), a Macintosh computer, a Unix workstation, or the like, running any of a number of different operating systems, such as Unix, Windows, MacOS, or the like. Such computer platforms and operating systems are considered to be well-known and will, therefore, not be described in further detail.

The JVM 100 includes, within an electronic memory (not shown) of the computer, a main memory 102 with a heap 104, and a JVM internal memory 106. The main memory 102 is an environment within which a Java application program 120, described further below, may be executed. The internal memory 106 is partitioned to include a logical area of memory, designated as a loader environment 200, for loading the application program 120. The internal memory 106 is used to operate the JVM 100 and is not generally accessible to a Java program running in that JVM for safety and security reasons. The JVM 100 also includes a function component 110 for providing a garbage collection function 110a, a system interface 110b, an execution engine 110c (for executing instructions contained in methods of loaded classes), and the like, including threads (not shown) as defined by the architecture of the JVM 100.

When the JVM 100 runs the Java application program 120, the memories 102 and 106 are used to store Java components, such as bytecodes (i.e., method bodies) and other information extracted from a loaded class file (described below), objects the program instantiates, parameters to Java methods, return values, local variables, intermediate results of computations, and the like. When a class instance or array is created in a running Java application program 120, the memory for the new class is allocated from the heap 104 portion of the main memory 102.

An instruction set associated with the JVM 100 includes an instruction for allocating memory on the heap 104 for a new object, but includes no instruction for freeing that memory. The JVM 100 is responsible for deciding whether and when to free memory occupied by objects that are no longer referenced by the running application. Generally, the garbage collection function 110a of the JVM 100 is used to manage the heap 104.

Figure 2:
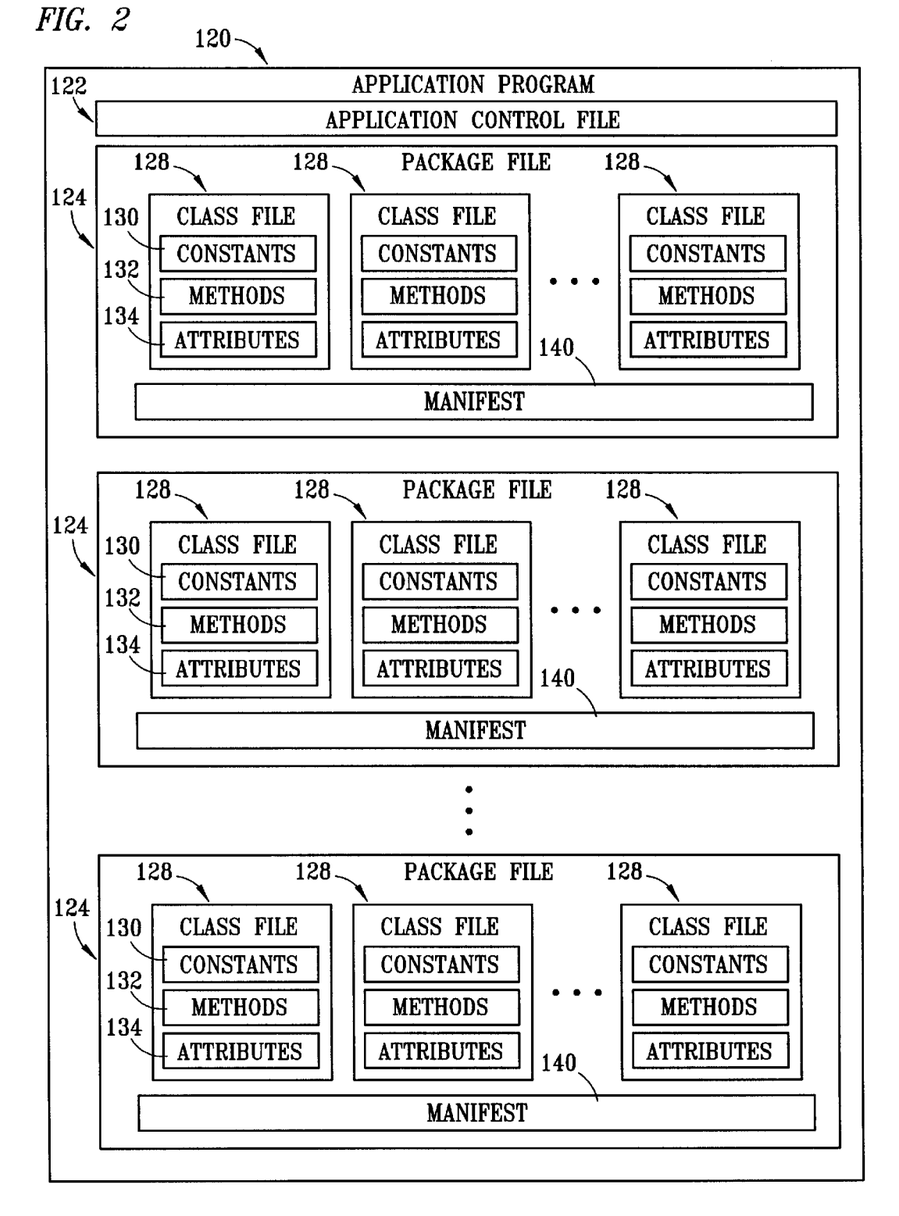
FIG. 2 is a block diagram illustrating an application program to be loaded onto the JVM of FIG. 1.

As discussed further below, FIG. 2 exemplifies the application program 120 as comprising data structures for an application control file 122, and three package files 124. The three package files 124 are substantially similar to each other in a structural sense and, for the sake of conciseness, will therefore be described below representatively as the package file 124. Each package file 124 is depicted as comprising data structures for three Java class files 128 which are substantially similar to each other in a structural sense and, for the sake of conciseness, will therefore described representatively as the class file 128. The package file 124 may also contain a manifest 140. As indicated by the ellipses, the application program 120 may comprise more or less than three package files 124, and more or less than three class files 128 within each package file 124. It should be noted though that the application program 120 is not a file, as such, containing within it the application control file 122, package files 124, though the application control file 122 does contain within it the identity of the package files included within the application program 120. The package files 124 do contain within them the class files 128.

Each class file 128 contains everything the JVM 100 needs to know about one Java class or interface. This information is set out in a well-defined class file format to ensure that any Java class file can be loaded and correctly interpreted by any JVM 100, no matter what computer system produced the class file 128 or what system hosts the JVM 100. The class file 128 includes a "magic number" (not shown), such as 0xCAFEBABE, which identifies it as a Java file. Each class file also includes a version number (not shown), a constant pool 130, a method_info portion 132, and an attributes portion 134, described below. Class files are considered to be well-known in the art and are described, for example, in a JVM specification entitled "The Java Virtual Machine" by Tim Lindholm and Frank Yellin (1997), ISBN 0-201-63452-X, which is commercially available from Sun Microsystems, Inc. or at the web address http://www.aw.com/cp/javaseries.

The constant pool 130 contains constants, such as literal strings, final variable values, class names, method names, and the like, associated with the class or interface defined by the file. It also contains names of other classes and methods referenced from within the class and its methods. Thus, by examining the class file 128, and particularly the constant pool 130, it is possible to identify all other classes required by the given class.

The method_info portion 132 contains information about a method (i.e., a procedure or a function), including the method name and descriptor, such as the return type, argument types, and the like; for non-abstract methods, a reference is also made to the bytecodes for the method.

The attributes portion 134 provides general information about the particular class or interface defined by the class file 128, such general information including (not shown) an attributes_count field, and a count of the number of attribute_info tables appearing in the subsequent attributes list. The first item in each attributes portion 134 is an index to the constant pool 130 of a CONSTANT_Utf8_info table that gives the name of the attribute. Attributes come in many varieties, several of which are defined by the aforementioned JVM specification. In accordance with well-known rules, however, varieties of attributes may be created and placed into the class file 128, as described below.

To build the application program 120, the source files to all classes must be compiled. The source files may be compiled using an existing software development tool, such as the Java Development Kit (JDK), which is commercially available from Sun Microsystems, Inc. A "key" class of the application program 120 must then be identified, and some method of the key class must be executed (possibly on a new instance object) to begin executing the application program.

From the key class, a list of all classes required by the application program 120 may be generated by recursively calculating the transitive closure of the dependencies of the application program. This may be achieved, after identifying all the classes required by the key class, by recursively identifying the requirements of each of the additional classes, until no new classes are known to be required. Such a list of classes may be generated using an order determination algorithm, such as a graph-walking algorithm or the like, well-known in the art.

From the list of classes, a list of packages may be obtained, wherein each class is a member of one and only one package. Each package identified will in turn have a list of its constituent classes, which list is generated by from the class files, or might be obtained from a database in an advanced software development environment or library system where the source files are maintained. The list of needed packages may be computed in a manner similar to that used for the classes, as described above. This list of packages is generated in a certain order such that each package loads before packages that depend on it, and is stored in the application control file 122. The order is determined as a by-product of the computation of the list of needed packages by the aforementioned order determination algorithm. The application control file 122 may also identify the "key" class and possibly other attributes of the application program 120, such as the date of its construction, security information, and the like.

For each package required, a package file 124 is generated containing the class files 128 of the package file 124, in such an order that each class file precedes classes that may depend on it. The package file 124 may also contain a manifest 140 providing security information for the classes and the like. The package load file may be in the format of a Java archive (JAR) file (not shown), or some other format. The JAR file format is well-known and is described in greater detail, for example, in a document entitled "jar-The Java Archive Tool" which is available at the web address http://www.javasoft.com/. This order may be determined as a by-product of computing the class needs, as described above with respect to the order determination algorithm, or may be computed anew through the same or a similar algorithm, applied only to the classes which constitute the package. It should be noted, however, that packages which may be part of a "standard library" associated with the JVM 100 need not have package files created for them; it is assumed that such packages are resident with the JVM and do not require loading to the JVM through this method.

As mentioned above with respect to FIG. 1, the JVM internal memory 106 includes a logical area of memory, designated as a loader environment 200, for loading the application program 120. The application program 120 includes at least one package, depicted in FIG. 2 as the package files 124, each of which have at least one type, i.e., at least one class file 128 and corresponding interface (not shown) having fully qualified names. The loader environment 200 catalogs each application, package, and class loaded, along with their relationships and other attributes. The relationships define, for example, which objects (e.g., application program 120, package files 124, class files 128, and the like) contain or are contained by which other objects, which objects require or are required by which other objects, and the like. Attributes for packages and classes include author, compile date, package build date, version of the package or class, version(s) of required packages or classes that are known to be compatible (or incompatible), and the like.

Referring back to FIG. 1, the loader environment 200 is configured for storing metadata describing attributes of the application programs 120 (FIG. 2), such as the version number, compile date, and the like, and attributes of the classes and packages loaded as part of those application programs. When the JVM 100 loads a Java application program 120, the JVM 100 parses attribute information from the application control file 122 (FIG. 2). Such attributes for the packages may be stored within the package file 124 within the manifest 140 (FIG. 2), (e.g., in the JAR file format described in the aforementioned JAR specification). For each class, attribute information is contained in the class file 128 (FIG. 2) as described above. Effectively, the JVM 100 builds within the loader environment 200 a collection of information about all loaded software, and makes such information available to programs running on the JVM via an application programming interface (API) in a manner well-known in the art.

Figure 3:
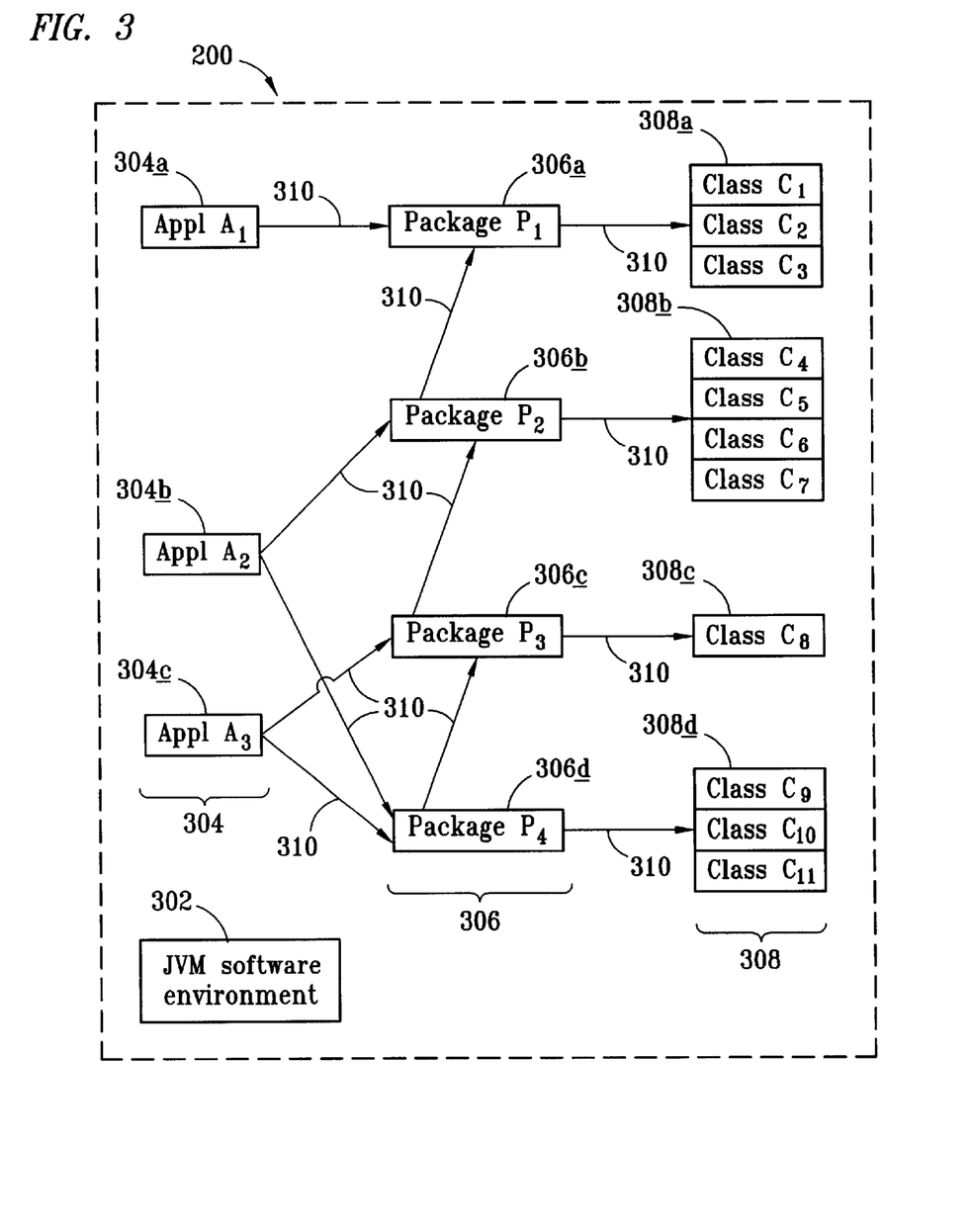
FIG. 3 is a block diagram illustrating a loader environment within the JVM of FIG. 1.

Such a collection of information in the loader environment 200 is exemplified in FIG. 3 as comprising a list 304 of applications 304a, 304b, and 304c, a list 306 of packages 306a, 306b, 306c, and 306d, and a list 308 of classes 308a, 308b, 308c, and 308d effective as data structures for cataloging the installed software of the loader environment 200. The number of applications, packages, and classes making up the loader environment 200 may vary from the number shown in FIG. 3. Relationships are also cataloged, as indicated by the arrows 310, such as between the application $A_1$ 304a and the package $P_1$ 306a. The loader environment 200 also contains a JVM software environment 302 (FIG. 4), which is part of the JVM 100. The software environment 302 contains such data as the methods of the classes, their types and arguments, and the like, as well as by-products such as native code generated by a just-in-time (JIT) compiler, and the like, stored in a manner well-known to the art. The class elements 308a–308d in the loader environment 200 may refer back to the JVM software environment 302.

The size of the loader environment 200 need not be fixed. As the Java application program 120 runs, the JVM 100 can expand and contract the loader environment 200 to fit the needs of the application. Generally, users or programmers may specify an initial size for the loader environment 200, as well as a maximum or minimum size.

Figure 4:
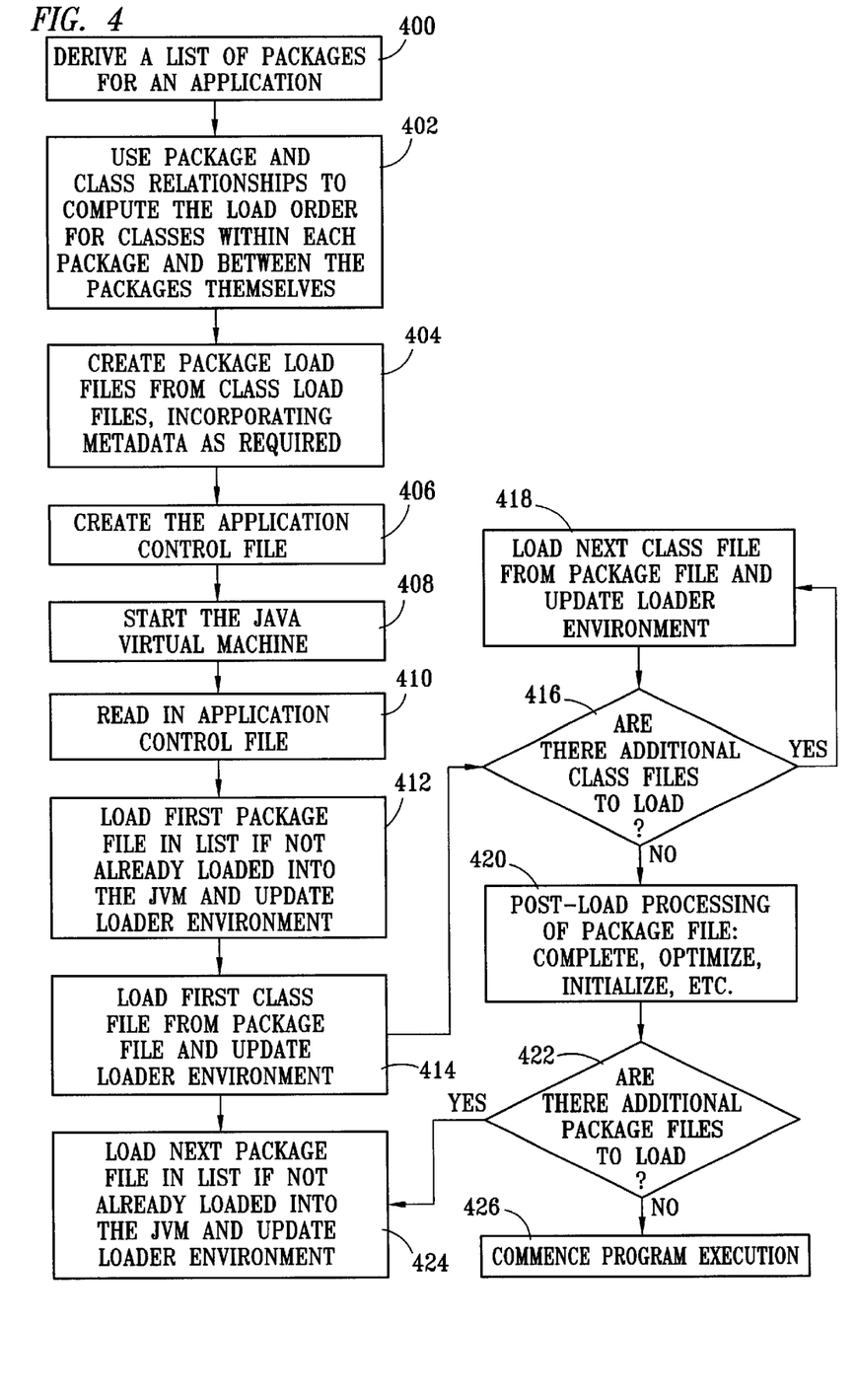
FIG. 4 is a flow chart illustrating steps for implementing the present invention.

FIG. 4 is a flow chart of steps implemented in the operation of loading the Java software packages 124 of an application program 120 in accordance with the present invention. Accordingly, in step 400, given the application 120 to be loaded to the JVM 100, a list of packages that are required for the application is derived. The package list may be derived using any available technique, such as, for example, by using a configuration management system (not shown).

In step 402, a class load order is determined first within each package for all of the class files 128 within that respective package, so that when each class is loaded, any classes on which that respective class depends will have been previously loaded. Similarly, a package load order is determined for each of the package files 124, as described above, so that when each package is loaded, any packages on which that respective package depends will have been previously loaded.

In step 404, any metadata associated with a class is incorporated into its respective class file 128. The class file 128 and any metadata associated with a package, including any security information, are then incorporated into a respective package file 124. These package files 124 may then be placed in some repository, such as a disk directory, web site, database, or the like, from which they may be loaded when required.

In step 406, the application control file 122 for the entire application program 120 is generated. The application control file 122 includes a list of the package files 124 in the order that they are to be loaded into the application program 120, and may also include other information, such as a "key" class, security information, and the like. The application control file 122 is also stored so that it may be used to load the application program 120; however, it need not be stored together with the package files.

In step 408, operation of the Java virtual machine 100 is initiated. The application program 120 to be loaded may be passed as a parameter to the JVM 100 by some means dependent on the operating system, or the JVM may wait for a command to load that is supplied externally, e.g., through a network interface.

In step 410, the JVM 100 reads the application control file 122, extracting information stored therein, including, in particular, the list of package files 124 making up the application program 120.

In step 412, the JVM commences to load and process the application 120 beginning with the first package file 124 on the list extracted in step 410, i.e., the package file 124 that does not depend on any other listed package file. Prior to actually loading the package, the JVM 100 first looks up the respective package in the loader environment 200 to determine whether the package has been previously loaded (such as, for example, in a standard library which may have been previously loaded). If the current package has not been loaded, then the JVM 100 verifies that any other packages on which the current package depends are loaded and are compatible. If such other packages are not loaded or are incompatible, then the JVM 100 stops loading and gives an error message, e.g., by displaying a message on a terminal screen (not shown), printing the message on a printer (not shown), or the like. Otherwise, if such other packages are loaded and are compatible with the package being loaded, then the JVM 100 opens the package file 124, by reading a disk file (not shown), by opening a network connection to download the package file 124 from another machine (not shown), by acquiring it from a database (not shown), or the like. The JVM 100 updates its loader environment 200 with data from the package file 124, which data represents attributes of the package, and of the relationship of the package being loaded to other packages.

In step 414, the JVM loads the first class file 128 from the package file 124 being loaded, decompresses it as necessary, verifies any security information, and links it into the JVM loader environment 200. This method by which class files 128 are loaded into the JVM, such as the JVM 100, is considered to be well-known in the art and will therefore not be described further. Additionally, attributes of the class, as well as its relationship to the package in which it is contained, are entered into the loader environment 200.

In step 416, if there are additional class files 128 in the package file 124 to load, execution proceeds to step 418; otherwise, execution proceeds to step 420. At step 418, the next class file 128 in the package file 124 being loaded is loaded in the manner described with respect to step 414, and the loader environment 200 is updated. Upon loading the next class file 128, execution returns to step 416.

In step 420, any additional processing, such as pre-compilation to native code, optimization, execution of the initialization routines for the classes, or the like, required for the classes 128 loaded from the package file 124 is performed in a manner well-known in the art.

In step 422, a determination is made whether there are additional package files 124 to load in the application program 120. If it is determined that there are additional package files 124 to load in the application program 120, then execution proceeds to step 424 wherein the next package in the list of packages extracted in step 410 is loaded. Following step 424, execution returns to step 414. If, in step 422, it is determined that there are no additional package files 124 to load in the application program 120, then execution proceeds to step 426, wherein execution of the application program 120 on the JVM 100 commences in a manner well-known in the art.

By the use of the present invention, a Java software application program may be efficiently preloaded onto the JVM 100 to thereby eliminate "lazy loading" and enhance the performance of real-time systems. The present invention also provides a basis for determining what software is loaded onto a running, as the loader environment 200 contains a list of the running application(s), packages, classes, their attributes, and their interrelationships. A JVM 100 using the method of this invention may provide an application programming interface (API) or some other method by which a program running on such a JVM 100 may query the loader environment 200 and inspect the information stored therein, or by which an external program may query the JVM for that information, or both.

It is understood that the present invention can take many forms and embodiments. Accordingly, several variations may be made in the foregoing without departing from the spirit or the scope of the invention; for example, more than one application may be loaded into a single JVM 100. In another example, an image of the loaded application may be stored in a non-volatile medium. That is, the state of the loader environment 200, including all classes, packages, and information about the classes and packages, may be written out to a non-volatile medium, such as a hard disk file. This information would include the code (including compiled or optimized code) for methods of the classes so written out. Then, in order to restart the JVM 100 with that same software at a later time, the disk file may be simply read in, allowing the JVM to bypass the steps 400–418 and 422–424 in the above description of the flow chart shown in FIG. 4. Instead, the JVM 100 would need only to reinitialize each class (thus recreating any initial data in the heap 104) and commence program execution (steps 420 and 426, respectively). Such a technique would greatly enhance the speed with which a JVM 100 could be restarted after a failure, such as a hardware crash. In still another example, the JVM 100 may provide an interface, such as a network interface, an inter-process communication interface configured for a particular operating system, or the like, through which interface an external program may inspect the data structures of the application program, packages, and classes loaded in the JVM.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for loading a Java application program onto a Java Virtual Machine ("JVM"), comprising the steps of:
   (a) identifying package files required for operation of the application program, each of which package files comprises at least one class file;
   (b) determining a package load order in which each respective package file may be loaded before any package file is loaded that depends on the respective package file;
   (c) determining a class load order in which each respective class file within each package file may be loaded before any class file is loaded that depends on the respective class file; and
   (d) loading into the JVM the package files in the package load order, and the class files within each package file in the class load order.

2. The method of claim 1 wherein the step of determining a package load order further comprises recursively calculating the transitive closure of dependencies of the package files.

3. The method of claim 1 wherein the step of determining a class load order further comprises recursively calculating the transitive closure of dependencies of the class files.

4. The method of claim 1 wherein the application program contains a key class, and the step of determining a package load order further comprises identifying all class files required by the key class, and recursively identifying the requirements of each of the class files, until no new class files are known to be required.

5. The method of claim 1 wherein the application program contains a key class, and the step of determining a class load order further comprises identifying all class files required by the key class, and recursively identifying the requirements of each of the class files, until no new class files are known to be required.

6. The method of claim 1 wherein the step of loading further comprises, for each respective package file, the steps of determining whether the respective package file has previously been loaded; and upon a determination that the respective package file has not been loaded, loading the respective package file.

7. The method of claim 1, wherein the step of loading further comprises the step of compiling all loaded class files.

8. The method of claim 1, wherein the step of loading further comprises the step of optimizing all loaded class files.

9. The method of claim 1, wherein the step of loading further comprises the steps of initializing all loaded class files.

10. The method of claim 1, wherein the step of loading includes comparing versions of loaded package files with requirements of the package files to be loaded, to determine version compatibility between package files.

11. The method of claim 1 wherein the JVM includes a loader environment, and the step of loading package files into the JVM further comprises loading each package file into the loader environment of the JVM.

12. The method of claim 1 wherein the JVM includes a loader environment, and step of loading of package files into the JVM further comprises loading each package file into the loader environment of the JVM; and storing in non-volatile memory or other media the contents of a loader environment, such that the contents may be retrieved by a fresh invocation of the JVM in order to execute the program without individually reloading each application, package file, and class file.

13. The method of claim 1 further comprising the step of generating with respect to each package file a package load file identifying in the class load order the class files contained within the respective package file.

14. The method of claim 1 further comprising the steps of generating an application control file identifying the package files in the package load order, and reading the application control file into the JVM; and the step of loading further comprises loading each package file into the JVM in the package load order stored in the application control file, wherein the loading of each respective package file further comprises loading each class file of the respective package file into the JVM in the class load order.

15. A method for loading a Java application program to a Java Virtual Machine ("JVM") residing on a computer, the Java application program including a plurality of package files, each of which package files includes a plurality of class files, the method comprising:
   determining a class load order in which each respective class file within each package file may be loaded before any class file is loaded that depends on the respective class file;
   determining a package load order in which each respective package file may be loaded before any package file is loaded that depends on the respective package file;
   storing the package load order in an application control file attached to the application program;

reading the application control file into the JVM; and loading each package file into the JVM in the package load order stored in the application control file, wherein the loading of each respective package file further comprises loading each class file of the respective package file into the JVM in the class load order.

16. The method of claim 15 wherein the step loading each respective package file further comprises compiling the respective package file.

17. The method of claim 15 wherein the step loading each respective package file further comprises initializing the respective package file.

18. The method of claim 15 wherein the step of loading each respective package file further comprises optimizing the respective package file.

19. The method of claim 15 wherein the step of determining a class load order further comprises recursively calculating the transitive closure of the dependencies of the application program.

20. The method of claim 15 wherein the step of determining a package load order further comprises recursively calculating the transitive closure of the dependencies of the application program.

21. The method of claim 15 wherein the JVM includes a loader environment, and step of loading each package file into the JVM further comprises loading each package file into the loader environment of the JVM.

22. The method of claim 15 wherein the JVM includes a loader environment containing information about software objects loaded on the computer through the JVM, and step of loading each package file into the JVM further comprises loading each package file into the loader environment of the JVM.

23. A Java Virtual Machine ("JVM") operable on a computer and having a loader environment containing information about software objects which may be loaded onto the computer through the JVM, the loader environment comprising:

an application data structure defined on an electronic memory of the computer, the application data structure being configured for receiving at least one application program;

at least one package data structure defined on the electronic memory of the computer for identifying each respective package of the application data structure in such an order that, when the packages are loaded, no respective package is loaded before the packages upon which the respective package depends are loaded; and at least one class data structure defined on the electronic memory of the computer for identifying each Java respective class data structure of the package data structure in such an order that, when the class data structures are loaded, no respective class data structures is loaded before the class data structures upon which the respective class data structure depends are loaded.

24. The JVM of claim 23 wherein the application data structure, the package data structure, and the class data structure include data structures which define relationships between application programs, package files, and class data structures.

25. The JVM of claim 23 wherein the application data structure further comprises attributes belonging to applications loaded onto the JVM, the package data structure further comprises attributes belonging to packages loaded onto the JVM package data structure, and the class data structure further comprises attributes belonging to class data structures loaded onto the JVM.

26. The JVM of claim 23 further comprising a program running in the JVM configured for inspecting the application data structures, the package data structures, and the class data structures in the JVM.

27. The JVM of claim 23 further comprising an interface between the JVM and an external program through which the external program may inspect the application data structures, the package data structures, and the class data structures in the JVM.

* * * * *